April 14, 1970     L. WEISBORD ET AL     3,505,866
SINGLE TINE DIGITAL FORCE TRANSDUCER
Filed Oct. 13, 1966
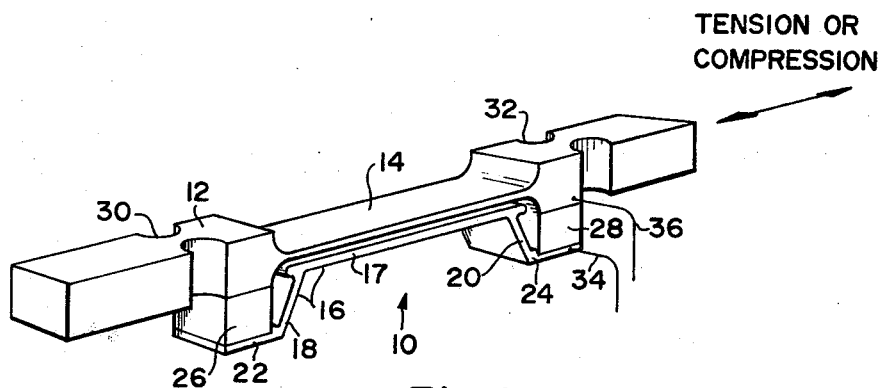
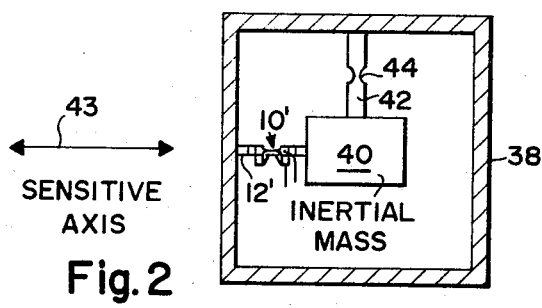
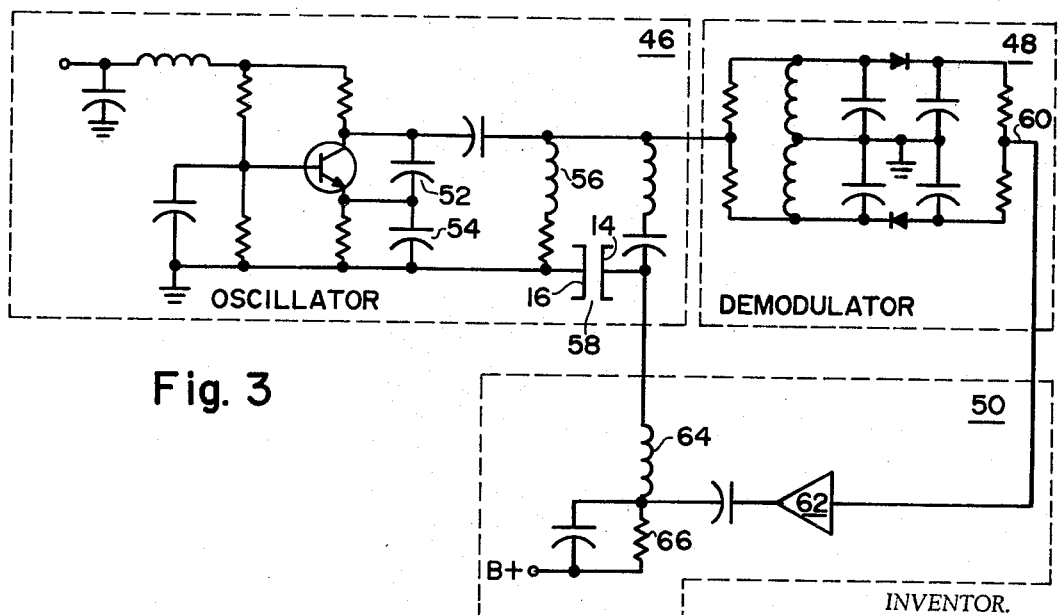
INVENTOR.
LEON WEISBORD
JEROME M. PAROS
BY
Karl A. Ohralik
ATTORNEY – # United States Patent Office 3,505,866
Patented Apr. 14, 1970

3,505,866
SINGLE TINE DIGITAL FORCE TRANSDUCER
Leon Weisbord, New York, N.Y., and Jerome Martin Paros, Darien, Conn., assignors to Singer-General Precision Inc., a corporation of Delaware
Filed Oct. 13, 1966, Ser. No. 586,408
Int. Cl. G01l 1/10
U.S. Cl. 73—141
7 Claims

ABSTRACT OF THE DISCLOSURE

The invention comprises a flat, vibrating tine which, together with a pick-off and drive member which is also flat and closely spaced to the tine, form the respective plates of an electrical capacitor which is a part of the frequency determining circuit of an oscillator. The tine vibrates at frequencies which are variable with the force applied to the tine, either lower for compressive forces or higher for tensile forces. As the tine vibrates the spacing between the capacitor plates is changed whereby the oscillator is frequency modulated. The output of the oscillator is applied to a frequency demodulating circuit which removes the carrier frequency and provides as an output, a potential varying at a rate equal to the tine vibration frequency. To maintain vibration of the tine and make up for any losses, a portion of the output potential of the demodulator is superimposed on a direct potential which is applied across the capacitor plates. This drives the tine at its vibration rate. Thus, changes in vibration of the tine, as caused by changes in stress applied to it, produce output potentials from the demodulator which are indicative of both the direction and intensity of the applied force.

---

This invention relates to force or stress measuring transducers effective to produce an indication of the direction and intensity of force applied thereto.

The need for sensing and measuring the direction and intensity of forces with great precision and reliability is required in many applications. As examples, many accelerometers and gyros are based in principle on the measurement of direction and intensity of forces and in the navigational and guidance systems where these components may be employed, great accuracy and reliability are paramount factors requiring commensurate accuracy of the force transducers used in the units. Also, pressure and other force systems utilize force transducers wherein similar accuracy and reliability may be required.

Additional requirements of force transducers in many of the applications, such as noted hereinabove, include high sensitivity, low power requirements and they should be light and compact. Also, where force transducers form a component of a system handling digital information, it is an advantage to obviate a separate component for converting analog information to digital form.

Force transducers satisfactorily meeting many of these requirements are known and employ a vibrating string. The string's natural frequency of vibration varies with changes in spring tension, caused by a force applying either more or less tension. Thus, an output frequency dependent upon the tension input is provided. While such transducers have met with considerable success, they do have adverse qualities. A string cannot measure compression; therefore, an initial tension greater than the expected maximum compressive load must be applied to the string in order to make the string capable of responding to compressive loads. The string tends to elongate with time and the initial tension of the string, therefore, decreases. Changes in tension result in changes in resonant frequency which cannot be distinguished from external load variations. This process of relaxation of the initial spring tension is hastened by increasing the operating temperature of the unit.

An important characteristic of a transducer is its "quality" factor or Q which is proportional to the ratio of energy stored therein to the energy lost per cycle during its operation. In the case of a high Q transducer, the energy input requirements are relatively low, whereas in contrast, the energy input requirements of a low Q transducer are relatively necessitating heavy and bulky power sources.

It has been proposed to minimize certain adverse characteristics of force transducers by employing elements in pairs. This has the desirable effect of cancelling out spurious signals produced by each individually. However, due to the inability to obtain precisely uniform operating frequencies of the two units, a frequent concomitant of such arrangements is a two peak response; that is, a pair of output signals, one from each individual transducer element which may interfere with each other. Also, in cases wherein a pickoff or drive and detection element is susceptible to vibration, such vibration may be near enough in frequency to the frequency of the beam so as to cause interference and obscure the desirable output of the transducer.

Many other factors affect the accuracy and reliability of a transducer. One important factor is the temperature coefficient of frequency which is the amount of change in the transducer output due to temperature change with the input thereto remaining the same. A common fault of prior accelerometers is the relatively high temperature coefficient of frequency.

In accordance with the prior art, typical force transducer outputs are analog values, usually potential levels corresponding to force applied. For utilizing the output signals so obtained in a digital computer or other digital system, an appropriate analog to digital conversion apparatus is required. Accordingly, a force transducer inherently producing a digital rather than analog output signal without sacrificing any of the desirable features of exising force transducers would be highly desirable as facilitating digital accuracies and obviating separate conversion apparatus.

Accordingly, it is a principal object of this invention to provide a force or stress measuring apparatus having the desirable qualities of previous force or stress measuring apparatus and yet incorporating reliability unaffected by age or temperature.

It is another object of this invention to provide a force or stress measuring apparatus having a single, self-supporting stress member, not requiring any pre-tensioning.

It is another object of this invention to provide a force or stress measuring apparatus having a low temperature coefficient of frequency to impart greater accuracy thereto.

It is another object of the invention to provide a force or stress measuring apparatus having a high quality response, having low energy dissipation, low power requirements and being small and light.

It is still another object of this invention to provide a force transducer component having a digital output signal.

In accordance with this invention, a vibrating beam transducer is provided preferably with a single, thin, flat surface tine portion intermediate to its ends forming one electrode of an electrical capacitor. A second electrode of the capacitor is formed by a pickoff and drive electrode, mounted in closely-spaced relationship to the first electrode and having a flat surface portion substantially co-extensive with it. The first electrode has a natural frequency of vibration which may be altered by the compression or tension applied along its longitudinal axis. The beam may be driven to vibrate at its variable natural frequency by applying across the capacitor plates a direct potential varying at the natural frequency of vibration of the beam. Thus, by mounting the beam so as to apply the tensile or compressive forces to be determined and detecting the frequency of vibration of the beam, an indication of the direction and intensity of the force is derived. Utilizing such a detected frequency to provide an input signal to a feedback and drive circuit, the beam may be maintained in vibration by driving it by means of the feedback signal applied across the beam and the second electrode. The beam in an unstressed condition vibrates at a certain initial frequency; when subjected to tension, it vibrates at a higher frequency and under compression, it vibrates at a lower frequency. The amount of frequency change from the initial frequency is an indication of the intensity of force applied to the beam.

A significant and inherent feature of the invention is that it produces a digital rather than analog output signal. The individual vibrations of the tine may be counted and the number occurring in some unit of time provides a digital value. Thus it is readily made compatible with other digital equipment.

In a practical system employing beam as a transducer element, the beam and pickoff electrode form a capacitor in the frequency-determining circuit of an oscillator. The oscillator oscillates at some carrier frequency determined in part by the capacitance of the capacitor so formed. The beam is mounted so that the forces to be sensed and measured are applied along the beam's longitudinal axis. Changes in force along this axis produce changes in vibration frequency of the beam. The detection circuit, which may be in the form of a frequency modulation discriminator, receives the output of the carrier frequency oscillator and produces a potential which is variable in amplitude at a rate corresponding to the beam vibration frequency. The detector has its output amplified and applied across the plates of the capacitor. Superimposed on this varying potential is a steady, direct potential providing an appropriate bias, whereby the beam is driven at a frequency of the variations of the output of the discriminator. Thus, the oscillator is frequency modulated by the vibrations of the beam since the spacing between the capacitor electrodes varies with such vibrations and the frequency of oscillation of the oscillator varies with the changes in capacitance produced by such changes in spacing.

The beam is designed so as to have hinges of reduced cross-section at locations intermediate the ends thereof and the plate or the electrode section of the beam. Such isolating hinges isolate the sensing portion of the transducer from motions perpendicular to the sensing axis. Because the pickoff and drive electrode may be designed to have a natural frequency of vibration, much higher than than the frequency of vibration of the sensing tine and of a much lower "Q" factor, its vibrations will not at all interfere with the vibrations of the sensing element.

Other and further objects and advantages of the invention will become apparent from the following detailed description thereof taken with the accompanying drawings in which:

FIGURE 1 is a perspective view of the transducer element, according to this invention, FIGURE 2 is a side view of a functional accelerometer employing a transducer element along a sensitive axis and being effective to sense tensile and compressive stresses, respectively, and FIGURE 3 shows schematically an electronic circuit in which the transducer of FIGURE 1 would be employed as an accelerometer component, for example.

Referring now to the drawings for a more detailed description of the invention, in FIGURE 1, showing an enlarged perspective view of the transducer component, 10 represents generally the transducer component in its entirety, including an elongated member 12 made of some high tensile metal, such as nickel alloy. Of course, various other metals or low temperature coefficient of frequency materials would be suitable for the purpose. In an operable force measuring system, the member 12 is mounted so as to receive the tensile and compressive forces, as the case may be. The member 12 is shown as being of rectangular cross-section; however, various other cross-sections would be suitable. Along a longitudinal portion of the member 12, it is reduced along opposite sides in the dimension of one cross-sectional axis to form a thin, web-like member 14. The cross-sectional dimension of the web-like member 14 is such as to facilitate a vibration of this portion of the member and yet to provide adequate tensile and compressive strength to the force loads of the accelerometer in which the component is to be employed. The dimensions of the tine and the physical properties of the tine determine its vibration frequency and the amount of change in vibration frequency in response to changes in stress applied to it.

A pickoff and drive member 16 is provided and is made of a suitable conductive material or material with conductive coating and has a thin surface portion 17 closely spaced to the web 14 and being substantially co-extensive in the surface area with the web 14. For mounting and securing the pickoff and drive member 16 in the position as shown in FIGURE 1, it is provided with a pair of leg portions 18 and 20 of reduced thickness relative to portion 17 and which are preferably integral with opposite ends of the surface portion 17. The leg portions are so reduced so as to reduce the ability of this member to resist or withstand axial stresses whereby the members 12 and 14 receive substantially all of such stresses. Extensions 22 and 24 of the legs 18 and 20, respectively, are provided and are secured to respective insulators 26 and 28 which are interposed between portions of the member 12 and respective extensions 22 and 24. The insulators are secured as by suitable bonding to both the member 12 and extensions 22 and 24. The insulators 26 and 28 may be of any suitable material such as alumina or other ceramic and electrically insulate the member 14 from the pickoff and drive electrode. The portion 17 of pickoff and drive elctrode member 16 and web 14 form the two plates or electrodes of an electrical capacitor. As such, they are closely and uniformly spaced along their adjacent surface portions.

The member 12 is further provided with reduced portions 30 and 32 forming a pair of hinges. These portions are reduced in an axial direction perpendicular to the axial direction of reduction of member 12 to form the web 14 and, as such, they facilitate the mechanical isolation of the member 14 from motions perpendicular to the sensing axis.

The tine 14 of the member 12 has a certain natural frequency of vibration in the free state of the member 12, that is, with no forces either tensile or compressive applied longitudinally to the member. However, in response to tensile forces applied to the member 12, the tine 14 is also placed in tension and, as a consequence, its natural frequency of vibration becomes increased. Conversely, when the member 12 and tine 14 are placed in compression, the natural frequency of vibration of the tine 14 becomes reduced or less than the frequency of vibration of the member in the non-compressed state. Thus, it is seen that the frequency of vibration of the member 14 provides an indication of the type of force, that is, tensile or compressive, applied to the member. Also, the amount of frequency change of vibration of the member 14 is an indication of the intensity of the force applied to the member.

As illustrating a practical application, the transducer component, as hereinabove described, may be employed in an accelerometer as shown in FIGURE 2, it being understood that the transducer has numerous other applications in other components and systems. In this figure, an enclosure 38, forming an accelerometer housing, has an inertial mass 40 secured to an interior wall of the enclosure 38 by an arm 42 having a hinge reduced portion 44. The inertial mass 40, thus, is free to swing relative to the enclosure 38 along a sensitive axis 43 designated in FIGURE 2. The transducer component designated 10', to indicate that it is similar to the transducer 10 shown in FIGURE 1, has one end of a corresponding stress member 12' secured to an interior wall of a frame member in the form of enclosure 38 and the other end secured to the inertial mass 40. In this position, the member 12' is stressed either in tension or compression in accordance with the motion of the inertial mass 40. Thus, as the enclosure 38 is either accelerated or decelerated along its sensitive axis, the inertial mass impresses either a tensile or compressive force upon the transducer component.

A transducer system, according to another aspect of this invention and employing the novel transducer component shown in FIGURE 1 of the drawings, is shown in FIGURE 3. The system shown in FIGURE 3 is cooperable with an accelerometer, as shown in FIGURE 2. In this figure, the three main components of the system includes an oscillator, enclosed in a dotted rectangle and designated 46, a demodulator circuit 48 and a tine drive circuit 50. The oscillator circuit 46 is shown as having a resonant tank circuit including capacitors 52, 54, inductor 56 and capacitor 58 which comprises as its respective electrodes the tine 14 and the pickoff and drive electrode 16 of the transducer component shown in FIGURE 1. It should be understood that while the oscillator 46 is shown as having a resonant tank circuit, it may take any one of numerous forms, such as oscillators of the resistance-capacitance phase shift type or of any type in which a capacitor forms a frequency-determining element. The oscillator 46 is operable at a relatively high carrier frequency, for example, of the order of 100 megacycles per second and the vibration of the capacitor plate 14 is effective to alter the capacitance of the capacitor 58 in accordance with the spacing between the plates 14 and 16 and, thus, to frequency modulate the oscillator 46. As noted hereinabove, the natural frequency of vibration of the element 14 is dependent upon the force applied thereto and, thus, the frequency modulation of the oscillator 46 is also dependent upon such forces. It is important to note that the output of a demodulator 48 is applicable to a suitable counter apparatus capable of counting the individual cycles of vibration per unit of time to thus provide a digital value of output representing the acceleration force applied to beam 12.

The frequency modulated output of oscillator 46 is applied to the input of demodulator circuit 48 in which, in a well-known manner, the demodulator is effective to remove the carrier frequency and provide an output on a line 60 at a frequency equal to the frequency of vibration of the tine 14. This demodulated signal is applied to the tine drive circuit 50 wherein it is amplified by an amplifier 62 and applied through a radio frequency choke 64 to the electrode 14 of capacitor 58. This vibration frequency potential is superimposed upon a steady, direct potential applied to this electrode from a source, B+, applied through a resistor 66 and choke 64. In accordance with a well-known phenomenon, the combination of direct and vibration frequency potentials applied in this manner is effective to apply mechanical forces between plates 14 and 16 so as to drive the tine 14 at the vibration frequency applied. The feedback circuit, thus described, makes up for the energy loss in the tine 14 in its vibration. The band widths of the circuit 48 and the tine 14 being co-extensive, the demodulator and amplifier 62 are effective to drive the tine 14 under any conditions of acceleration and consequent frequency of vibration.

From the foregoing description it is clear that the force transducer in accordance with this invention provides for greater accuracy, reliability and improved results. In particular, by virtue of the fact that the tine 14 does not require prestressing to accommodate compressive loads, it is unaffected by aging and occurs in the case of pre-stressed string type force transducers. This improvement is accentuated in cases wherein the transducer is employed in relatively high temperature environments which, in the case of pre-stressed strings, enhances the aging, causing the string to yield and reduce its tension due to pre-stressing. In addition, the low temperature coefficient of the material from which the tine 14 may be made provides for relatively low changes in frequency of vibration due to changes in temperature. These factors, together with the high quality response of a single tine providing a digital output, facilitate unusual accuracy, reliability and overall superior performance of a force transducer according to this invention.

What is claimed is:

1. An apparatus comprising a first elongated member having mutually perpendicular longitudinal and cross-sectional axes, a thin tine portion intermediate to the ends of said member and being reduced along opposite sides in the direction of one cross-sectional axis, said tine portion having a conductive surface, a second member having a conductive surface substantially co-extensive with the conductive surface of said tine portion and being substantially uniformly spaced therefrom throughout its area, electronic oscillator means having a frequency determining circuit, the time portion of said first member and conductive surface portion of said second member forming a capacitor in said frequency determining circuit, frequency demodulator means for demodulating the output of said oscillator means to provide a signal at the frequency of vibration of said tine and means responsive to said demodulator means for applying a direct potential varying at said frequency of vibration across said members for maintaining vibration of said tine.

2. A force transducer according to claim 1, wherein said member comprises a further portion on respective sides of said tine and being reduced in the direction of the other cross-sectional dimension to form a pair of mechanical insulating hinges.

3. A force transducer according to claim 2, wherein said first member is made of a high tensile and compressive strength metal and said second member is secured to said first member in insulating relationship.

4. An apparatus according to claim 1, additionally comprising a frame member and means for pendulously mounting a mass to said frame member, means for securing respective ends of said first member to said frame and to said mass whereby acceleration of said frame in a direction of said longitudinal axis of said first member is effective to impress a stress on said tine portion.

5. An apparatus according to claim 1, wherein said first elongated member is solid and made of high tensile and compressive strength metal.

6. A transducer system comprising means for producing electrical oscillations at a first frequency and including an electrical capacitor having a pair of electrodes, said capacitor being in the frequency determining circuit of said oscillation producing means, one of said electrodes being capable of vibration relative to the other electrode at a variable frequency dependent upon the mechanical stress therein, means for detecting the output potential of said oscillation producing means and deriving a potential varying at said variable frequency to provide an indication of the stress in said one electrode and means coupled to said potential deriving means and being effective to drive said one electrode at said variable frequency.

7. A transducer system according to claim 6, wherein said vibration producing means comprises means for applying a direct potential varying at said variable frequency across said electrodes.

References Cited

UNITED STATES PATENTS

| | | |
|---|---|---|
| 2,477,085 | 7/1949 | Rieber. |
| 3,190,129 | 6/1965 | Kritz et al. _____ 73—517 |
| 3,295,360 | 1/1967 | Dimeff _____ 73—398 XR |
| 3,391,560 | 7/1968 | Mathey _____ 73—67.2 |

CHARLES A. RUEHL, Primary Examiner

U.S. Cl. X.R.

73—67.2, 517